July 15, 1924.

J. E. CANNING

DENTAL MANDREL

Filed Feb. 18, 1922

1,501,269

Inventor
John E. Canning.
By
Attorney

Patented July 15, 1924.

1,501,269

UNITED STATES PATENT OFFICE.

JOHN E. CANNING, OF DENVER, COLORADO; S. C. WARNER ADMINISTRATOR OF SAID JOHN E. CANNING, DECEASED, ASSIGNOR TO THE DENTAL SPECIALTY COMPANY, A CORPORATION OF COLORADO.

DENTAL MANDREL.

Application filed February 18, 1922. Serial No. 537,400.

*To all whom it may concern:*

Be it known that I, JOHN E. CANNING, a citizen of the United States, residing at Denver, in the city and county of Denver and State of Colorado, have invented certain new and useful Improvements in Dental Mandrels; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to dental mandrels and has special reference to a means whereby the grinding disc or wheel can be securely held in place and prevented from coming loose regardless of the direction of rotation.

Grinding discs or wheels are usually secured to the end of the rotating mandrel by means of a screw which passes through the disc and extends into the end of the mandrel, the clamping action of the screw being relied upon to prevent the disc from turning.

It has been found, however, that when a disc is clamped to the end of a mandrel by means of a screw in the manner described, it will stay in place as long as the disc is rotated, in such a direction that the tendency is to tighten the screw, but that when the disc is rotated in the opposite direction the screw will loosen and permit the disc to rotate and occasionally to fall off or break.

I have found that by adding to the combination another element that I am able to rotate my disc in either direction without loosening the same, which is a result that has long been desired and often sought but never, to my knowledge, before attained.

In order to more clearly describe my invention, I shall have reference to the accompanying drawing in which—

The same reference character will be used to designate the same parts throughout the several views.

Numeral 1 represents a mandrel which is provided at its outer end with an enlarged portion 2 against the outer surface of which the carborundum grinding disc 3 is clamped by means of a screw 4 which projects through the central opening in the disc and extends a considerable distance into the mandrel 1.

In the prior art the disc 3 has been clamped between the end of the mandrel 1 and the head of the screw 4, by which means the disc is satisfactorily retained in place as long as the direction of rotation is such that it tends to tighten the screw 4, but if the rotation is in the opposite direction, experiments have proven that the disc will soon become loose and inoperative.

To have a grinding disc become loose while it is employed within a patient's mouth may result in a serious accident, as the disc may break and the flying particles cause great injury.

Figure 1:
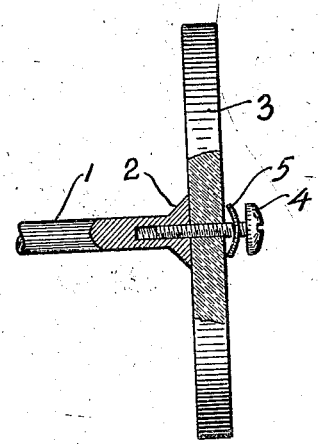
Fig. 1 shows a section of a mandrel and grinding disc, partly assembled, in accordance with my invention.
Figure 2:
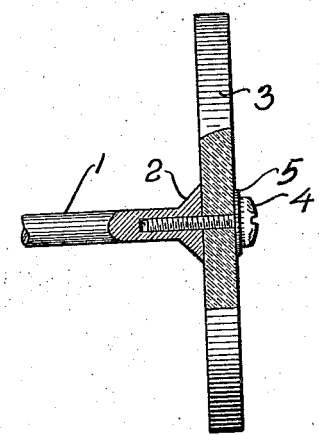
Fig. 2 shows the mandrel and disc in fully assembled relation.

I have found that by the simple expedient of adding a spring washer 5 between the outer surface of the disc and the head of the screw 4 in the manner shown in Fig. 1, and then tightening the screw until the washer assumes a substantially flat surface, as indicated in Fig. 2, that the disc may be safely rotated in either direction without becoming loose.

I have proven the above assertion by innumerable experiments, and have conclusively demonstrated that by the simple expedient above described, the much desired reversible grinding disc can be attained.

I want to call particular attention to the fact that my washer 5 is not a lock washer in the generally accepted meaning of that term as it does not prevent relative rotation of the screw and disc.

The mandrel 1 corresponds to the nut on a bolt, and if the principle of a lock washer were employed, the washer would have to be placed between the end of the mandrel and the side of the disc, which is not necessary in the case under consideration.

I am aware that the expedient employed by me is very simple, but it accomplishes a useful result, and I therefore desire protection for my discovery under the patent laws.

I have shown my spring washer 5 as being made of an ordinary washer transversely curved as indicated in Fig. 1, but the washer may be made in many different ways and the one shown is illustrative only as almost any kind of spring washer can be employed.

Figure 3:
Fig. 3 shows a modified form of screw.

In Fig. 3 I have shown a screw 4' in which a spring member 5' is cut integrally from the screw head itself and curved downwardly as shown. This member 5' forms an element that performs substantially the same function as the spring washer 5, and has the advantage that it requires no assembling and cannot fall off and get lost.

Having now described my invention, what I claim as new is—

The combination of a spindle having an axial interiorly threaded bore surrounded by a flat concentric shoulder, and a perforated disk engaging said shoulder and having flat surface coacting with the corresponding face of the mandrel and its periphery concentric with the axis of the spindle, a headed screw passing through the perforation of the disk and threaded in the socket of the spindle, and a spring washer located between the disk and the head of the screw and engaging the disk in opposing relation to the shoulder of the spindle.

In testimony whereof I affix my signature.

JOHN E. CANNING.